US012367779B2

(12) United States Patent
Bode

(10) Patent No.: US 12,367,779 B2
(45) Date of Patent: Jul. 22, 2025

(54) SYSTEM AND METHOD TO GENERATE AND DISPLAY RUNWAY OVERRUN AWARENESS AND ALERTING SYSTEM (ROAAS) IMAGE DEPICTING CURRENT RUNWAY DISPLACED THRESHOLD VALUE AND CURRENT LANDING DISTANCE AVAILABLE VALUE

(71) Applicant: Rockwell Collins, Inc., Cedar Rapids, IA (US)

(72) Inventor: Carl H. Bode, Plankinton, SD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 221 days.

(21) Appl. No.: 18/233,072

(22) Filed: Aug. 11, 2023

(65) Prior Publication Data
US 2025/0054398 A1 Feb. 13, 2025

(51) Int. Cl.
*G08G 5/54* (2025.01)
*G08G 5/21* (2025.01)

(52) U.S. Cl.
CPC ............. *G08G 5/54* (2025.01); *G08G 5/21* (2025.01)

(58) Field of Classification Search
CPC ... G08G 5/54; G08G 5/21; G08G 5/26; G01C 23/00
See application file for complete search history.

(56) References Cited

U.S. PATENT DOCUMENTS

| 8,046,165 | B2 | 10/2011 | Sacle et al. |
| 8,200,378 | B1 | 6/2012 | Chiew et al. |
| 8,970,399 | B1 | 3/2015 | Zimmer et al. |
| 9,041,560 | B2 | 5/2015 | Venkataswamy et al. |
| 9,098,996 | B2 | 8/2015 | Barraci et al. |
| 9,573,698 | B1 * | 2/2017 | He .................. G08G 5/21 |

(Continued)

FOREIGN PATENT DOCUMENTS

| CN | 105549938 B | 8/2020 |
| EP | 3321634 B1 | 8/2019 |

(Continued)

OTHER PUBLICATIONS

European Search Report received in EP Application No. 24194182.2, Dec. 16, 2024, 9 pages.

(Continued)

*Primary Examiner* — Behrang Badii
(74) *Attorney, Agent, or Firm* — Suiter Swantz IP

(57) ABSTRACT

A system may include a display and at least one processor. The at least one processor may be configured to: obtain a Notice to Air Mission (NOTAM); extract information from the NOTAM, the information including information of a runway displaced threshold of the runway and/or a landing distance available on the runway; generate a NOTAM file including the information; update runway overrun awareness and alerting system (ROAAS) data to include a current runway displaced threshold value and a current landing distance available value based on the information of the NOTAM file; generate a ROAAS image, wherein the ROAAS image graphically and/or textually depicts a view indicative of the current runway displaced threshold value and the current landing distance available value; and output the ROAAS image to the display.

18 Claims, 8 Drawing Sheets

(56) References Cited

U.S. PATENT DOCUMENTS

| | | | |
|---|---|---|---|
| 9,672,749 | B1 | 6/2017 | Samuthirapandian et al. |
| 11,024,185 | B2 | 6/2021 | Turner et al. |
| 11,282,400 | B2 | 3/2022 | Byxbe et al. |
| 2007/0250224 | A1 | 10/2007 | Dwyer |
| 2011/0264313 | A1 | 10/2011 | Sampath |
| 2012/0209458 | A1 | 8/2012 | Sampath |
| 2013/0090841 | A1 | 4/2013 | Barraci et al. |
| 2013/0278444 | A1 | 10/2013 | Venkataswamy et al. |
| 2017/0036776 | A1* | 2/2017 | He .......................... G08G 5/21 |
| 2017/0275020 | A1 | 9/2017 | Charbonnier et al. |
| 2019/0096267 | A1 | 3/2019 | Shamasundar et al. |
| 2022/0343777 | A1 | 10/2022 | He et al. |
| 2023/0026834 | A1 | 1/2023 | Desai et al. |
| 2023/0060551 | A1 | 3/2023 | Khatwa |
| 2023/0237916 | A1* | 7/2023 | Artic ........................ G08G 5/55 |
| | | | 340/971 |

FOREIGN PATENT DOCUMENTS

| | | |
|---|---|---|
| EP | 3012590 B1 | 8/2020 |
| EP | 3854692 A1 | 7/2021 |
| WO | 2011128835 A2 | 10/2011 |

OTHER PUBLICATIONS

European Search Report received in EP Application No. 24194150. 9, Jan. 14, 2025, 8 pages.

Federal Aviation Administration, Pilots NOTAM Back to basics primer for 2021, 45 pages.

* cited by examiner

SYSTEM AND METHOD TO GENERATE AND DISPLAY RUNWAY OVERRUN AWARENESS AND ALERTING SYSTEM (ROAAS) IMAGE DEPICTING CURRENT RUNWAY DISPLACED THRESHOLD VALUE AND CURRENT LANDING DISTANCE AVAILABLE VALUE

BACKGROUND

Currently, the runway overrun awareness and alerting system (ROAAS) format requires manual entry in the event there are Notice to Air Missions (NOTAMs) which affect the runway displaced threshold or landing distance available for the selected landing runway. This requires crew attention and time to read through the NOTAM reports, decipher the text, and manually enter the runway displaced data. Such manual entry further includes a possibility for entry of inaccurate information, which can cause safety problems.

SUMMARY

In one aspect, embodiments of the inventive concepts disclosed herein are directed to a system. The may include a display and at least one processor, one or more of the at least one processor communicatively coupled to the display, the at least one processor configured to: obtain a Notice to Air Mission (NOTAM) associated with an approach procedure being performed by an aircraft toward a runway; extract information from the NOTAM, the information including information of at least one of a runway displaced threshold of the runway or a landing distance available on the runway; generate a NOTAM file including the information; update runway overrun awareness and alerting system (ROAAS) data including an existing runway displaced threshold value associated with the runway and an existing landing distance available value associated with the runway to be a current runway displaced threshold value and a current landing distance available value based on the information of the NOTAM file; generate a ROAAS image, wherein the ROAAS image graphically and/or textually depicts a view indicative of the current runway displaced threshold value and the current landing distance available value; and output the ROAAS image to the display. The display is configured to display the ROAAS image to a user.

In a further aspect, embodiments of the inventive concepts disclosed herein are directed to a method. The method may include: obtaining, by at least one processor, a Notice to Air Mission (NOTAM) associated with an approach procedure being performed by an aircraft toward a runway, wherein one or more of the at least one processor is communicatively coupled to a display; extracting, by the at least one processor, information from the NOTAM, the information including information of at least one of a runway displaced threshold of the runway or a landing distance available on the runway; generating, by the at least one processor, a NOTAM file including the information; updating, by the at least one processor, runway overrun awareness and alerting system (ROAAS) data including an existing runway displaced threshold value associated with the runway and an existing landing distance available value associated with the runway to be a current runway displaced threshold value and a current landing distance available value based on the information of the NOTAM file; generating, by the at least one processor, a ROAAS image, wherein the ROAAS image graphically and/or textually depicts a view indicative of the current runway displaced threshold value and the current landing distance available value; outputting, by the at least one processor, the ROAAS image to the display; and displaying, by the display, the ROAAS image to a user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
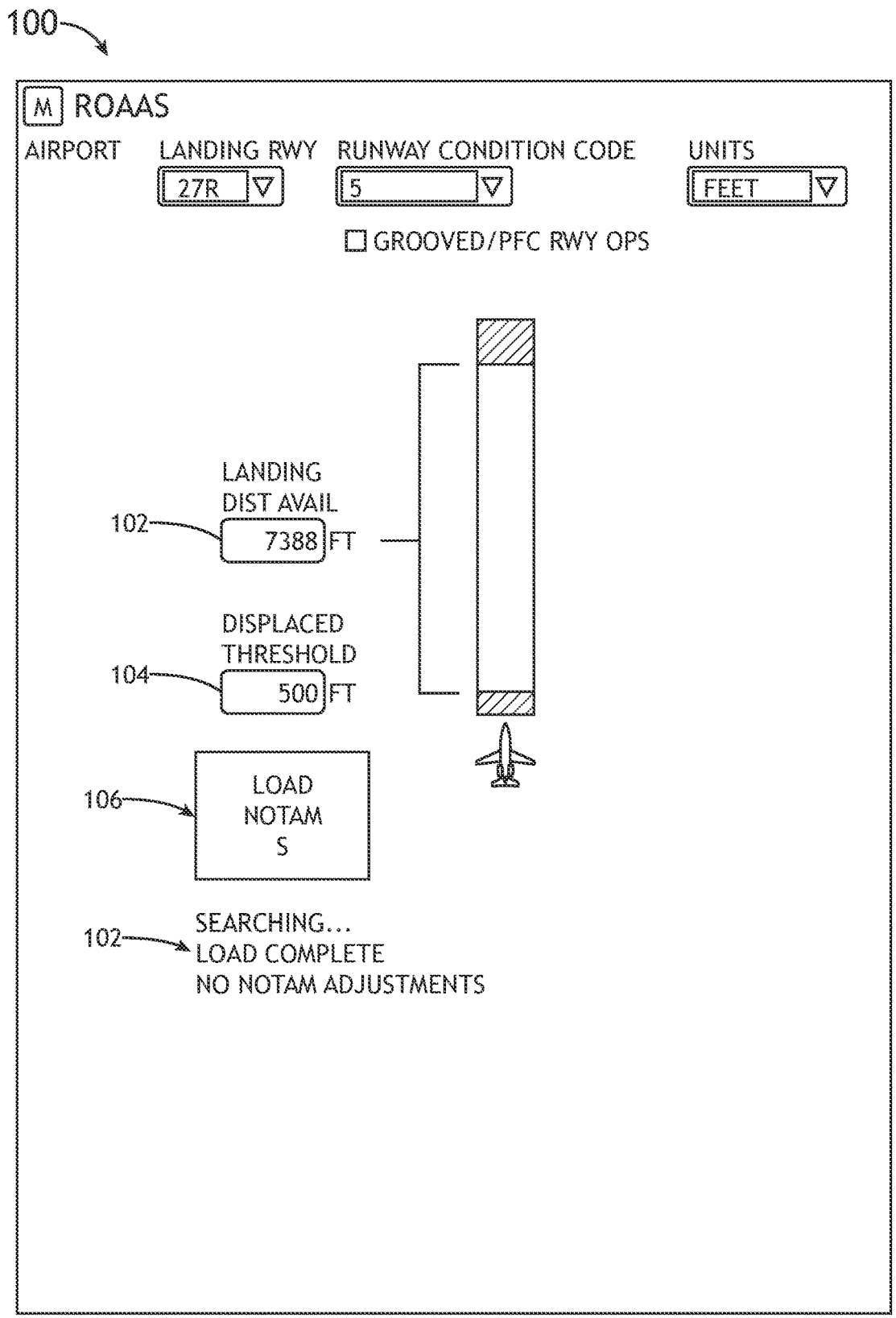
FIG. 1 is a view of an exemplary embodiment of a view of a runway overrun awareness and alerting system (ROAAS) image according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a method and a system including at least one processor configured to extract information of a runway displaced threshold of a runway and/or a landing distance available on the runway from a Notice to Air Mission (NOTAM), to update runway overrun awareness and alerting system (ROAAS) data to be a current runway displaced threshold value and a current landing distance available value, and/or to generate a ROAAS image.

Some embodiments may improve functioning of a computing device(s) (e.g., of an aircraft), itself, by improving the accuracy of data important to the functioning of a ROAAS system of an aircraft. Some embodiments may improve safety of operating an aircraft by improving the accuracy of data important to the functioning of a ROAAS system of an aircraft and/or by reducing pilot workload, which may otherwise detract from a pilot's ability to focus on important flight tasks.

Some embodiments may provide a user-interfaceable control on a ROAAS image to load NOTAMs and parse through the NOTAM report to determine if there are runway displacements for the selected landing runway and automatically populate those fields on the ROAAS format. Some embodiments may convert NOTAM reports to a format including meta tags which can be loaded into the system and parsed for relevant information. For example, the ROAAS format may provide a status indication below a "LOAD NOTAMS" button to provide feedback to the flight crew when loading NOTAMS and indicate when runway offsets have been programmed into the ROAAS format. In some embodiments, the system may change a color of readouts in the displaced threshold and/or landing distance available field when the system updates the displaced threshold and/or landing distance available values in the ROAAS; for example, the color change may be from small white to medium magenta when NOTAM adjustments are made to these fields. Such color scheme may be consistent with the rest of the flight deck where cyan represents a manual entry and magenta represents a system calculated entry.

In some embodiments, the user and/or the system may access a NOTAM website (e.g., a Federal Aviation Administration (FAA) NOTAM website) to obtain a NOTAM. In some embodiments, the system may parse through the NOTAM and add metadata (e.g., metatags) for the system to parse through NOTAM data. In some embodiments, an information management system (IMS) computing device may obtain the NOTAM data, such as directly, by a user loading the NOTAM data from a portable storage device (e.g., a universal serial bus (USB) memory stick) or by obtaining the NOTAM data from an internet-connected computing device onboard the aircraft. In some embodiments, a user may select the ROAAS format on a display unit (e.g., an adaptive flight display (AFD)), for example, by using a cursor control pad (CCP) cursor controller and/or a multi-key pad (MKP). In some embodiments, a flight display system application (FDSA) executed by a processor of a display unit computing device (e.g., an AFD) may draw the ROAAS format on the display. In some embodiments, the user may select the LOAD NOTAMS button on the ROAAS format. In some embodiments, the FDSA may display a dialog box in the ROAAS format for the user to select the NOTAM file to load. In some embodiments, the FDSA may send a request to the ROAAS to display the NOTAM files available to load. In some embodiments, the ROAAS computing device may forward the request to the IMS computing device to list the NOTAM files available to load. In some embodiments, the IMS computing device may send the list of NOTAM files to the ROAAS computing device which may forward the list to the FDSA. In some embodiments, the user may select the NOTAM file to load using the CCP and/or the MKP. In some embodiments, the FDSA may send the request to the ROAAS computing device to load the NOTAM file selected by the user. In some embodiments, the ROAAS computing device may forward the request to the IMS computing device to send the data from the NOTAM file selected by the user. In some embodiments, the IMS computing device may begin transfer of data from the selected NOTAM file (e.g., on USB memory stick) to the ROAAS computing device. In some embodiments, the ROAAS computing device may provide a load status for load progress, load fail, load complete, threshold offsets updated, and/or no matching NOTAM file to the FDSA. In some embodiments, the FDSA may display the load status on the ROAAS format. In some embodiments, the ROAAS computing device may parse through the metatagged data in the NOTAM file and update the displaced threshold and/or landing distance available entry fields for the applicable destination airport and landing runway. In some embodiments, the ROAAS may send the displaced threshold and/or landing distance available data to the FDSA for display on the ROAAS format.

Referring now to FIG. 1, an exemplary embodiment of an exemplary view of a ROAAS image 100 (e.g., an image of a ROAAS format) is shown. For example, the ROAAS image 100 may the ROAAS image may graphically and/or textually depict a view indicative of a current runway displaced threshold value 102 (e.g., associated with a runway displaced threshold) and/or a current landing distance available value 104 (e.g., associated with a landing distance available). The displaced threshold is the distance the threshold is offset from the start of the runway; this area is not suitable for landing, but may be used for taxi onto the runway or start the takeoff roll. The landing distance available is the declared distance suitable and available for landing an aircraft; this distance begins where the displaced threshold ends. In some embodiments, the ROAAS image 100 may the ROAAS image may further graphically and/or textually depict a user-selectable load button 106 for loading a NOTAM file(s) and/or a status indicator 108 for indicating status of a NOTAM file load operation.

Figure 2:
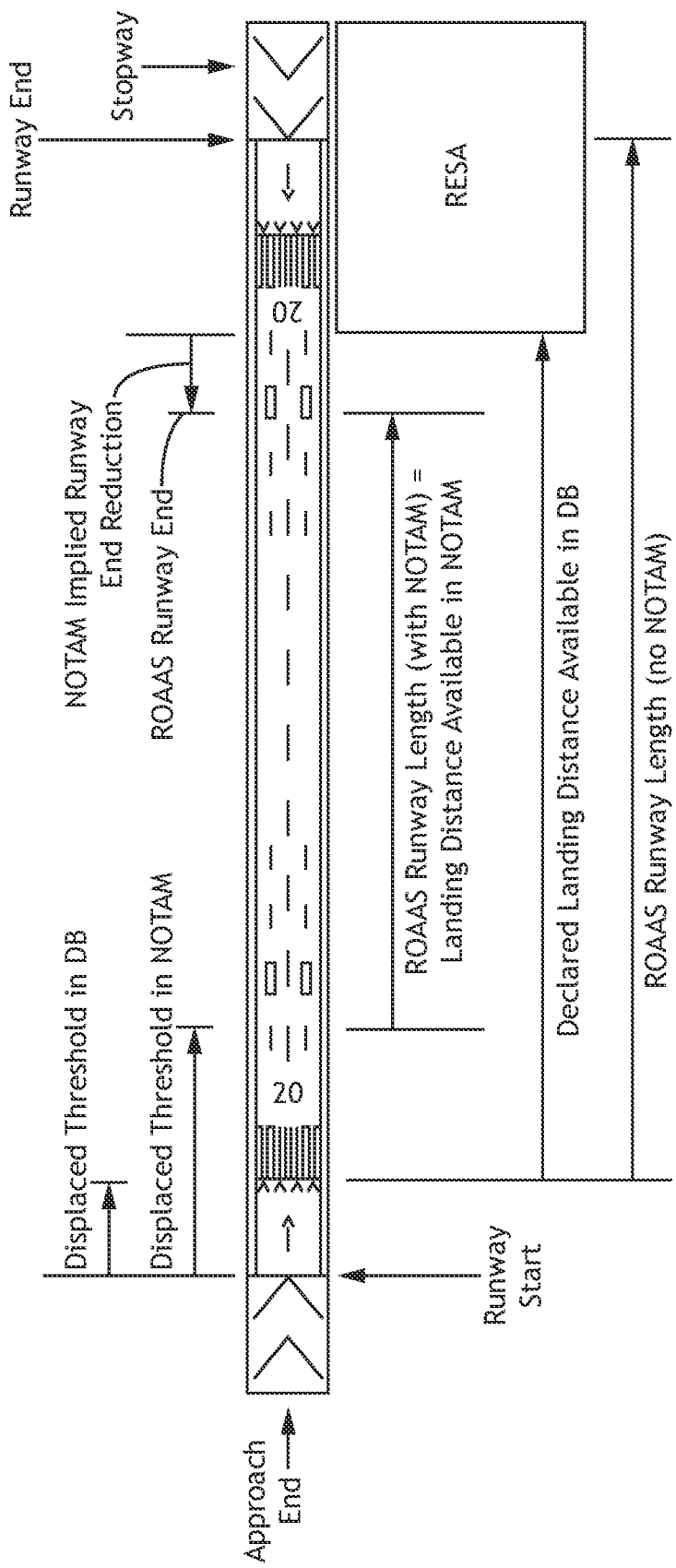
FIG. 2 is an exemplary diagram illustrating ROAAS information according to the inventive concepts disclosed herein.
Figure 3:
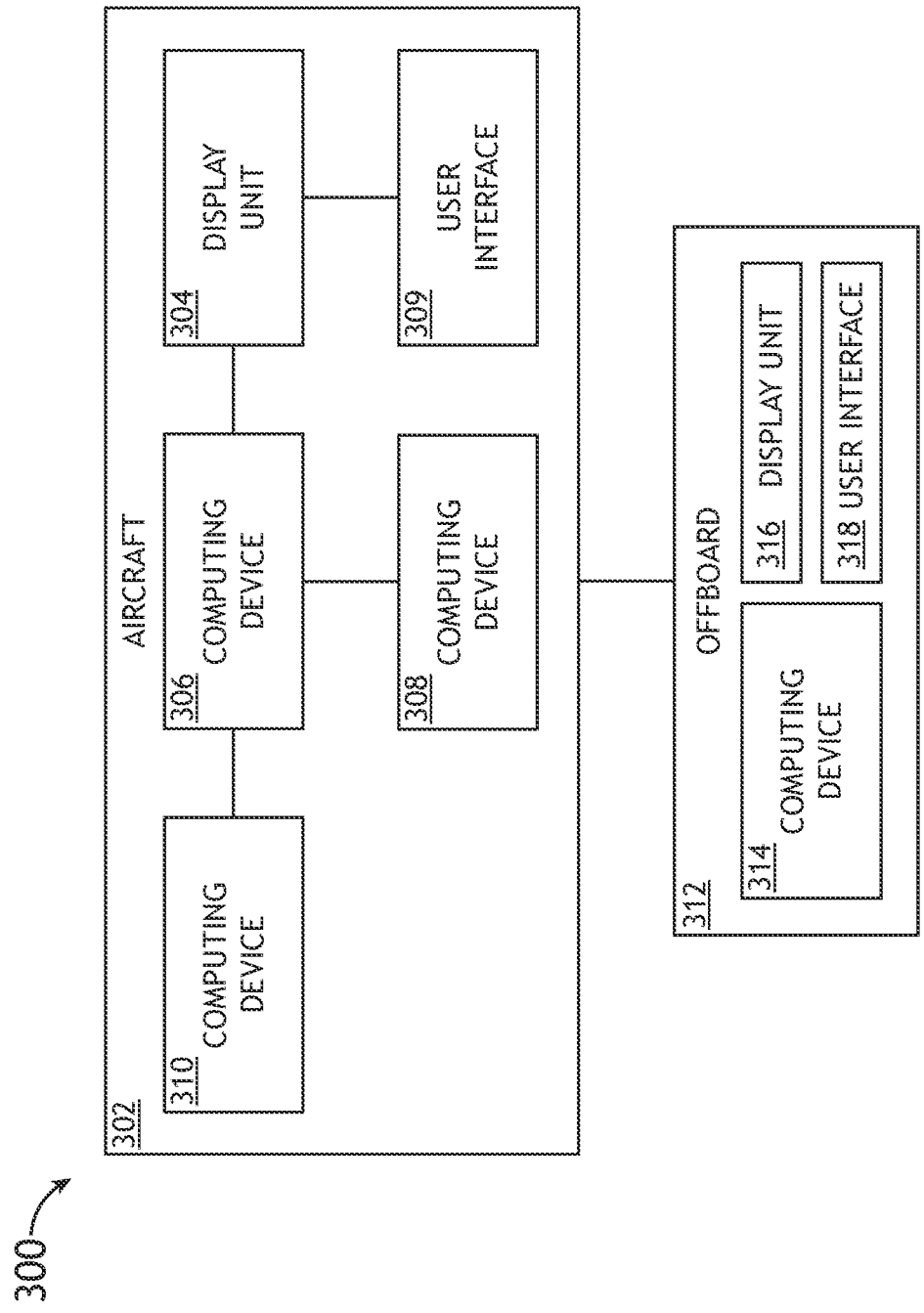
FIG. 3 is a view of an exemplary embodiment of a system including an aircraft according to the inventive concepts disclosed herein.

Referring now to FIG. 2, an exemplary diagram illustrating ROAAS information is shown. For example, the ROAAS may have access to and/or determine any of the following information: an approach end; a runway start; a runway end (e.g., a physical end of the runway); a stopway; a ROAAS runway length lacking NOTAM information; a displaced threshold (e.g., a runway displaced threshold) in an airport database; a displaced threshold according to a NOTAM; a declared landing distance available in the airport database; a NOTAM implied runway end reduction; and/or a ROAAS runway end.

Referring now to FIGS. 3, 4, 5, 6, and 7, an exemplary embodiment of a system 300 according to the inventive concepts disclosed herein is depicted. In some embodiments, the system may include an aircraft 302 and/or at least one offboard platform 312, some or all of which may be communicatively coupled at any given time.

In some embodiments, the aircraft 302 may include at least one onboard pilot and may be a single-piloted or multiple-piloted aircraft; in some embodiments, the aircraft 302 may be an uncrewed aerial system (UAS) (e.g., a remote-piloted UAS and/or an autonomous UAS). In some embodiments, the aircraft 302 may include at least one user (e.g., flight crew and/or pilot(s)), at least one display unit computing device 304, at least one computing device 306, at least one computing device 308, at least one user interface 309, at least one computing device 310, at least one flight management system (FMS) 602, at least one global position system (GPS) 604, at least one radio altimeter 606, at least one air data computer (ADC) 608, at least one engine indication and crew alerting system (EICAS) 610, at least one inertial reference system (IRS) and/or AHRS 612, at least one airport database 614 maintained in memory, at least one aircraft parameters 616 maintained in memory, and/or at least one application configuration 618 maintained in memory, some or all of which may be communicatively coupled at any given time.

In some embodiments, the at least one display unit computing device 304, the at least one computing device 306, the at least one computing device 308, the at least one user interface system 309, the at least one computing device 310, the at least one computing device 314, the at least one display unit computing device 316, and/or the at least one user interface 318 may be implemented as a single computing device or any number of computing devices configured to perform (e.g., collectively perform if more than one computing device) any or all of the operations disclosed throughout. For example, in some embodiments, the at least one display unit computing device 304, the at least one computing device 306, the at least one computing device 308, the at least one user interface 309, the at least one computing device 310, the at least one display unit computing device 316, and/or the at least one user interface 318 may be installed in the aircraft 302, the offboard platform 314, or some combination thereof. For example, some or all of the computing devices (e.g., 304, 306, 308, 309, 310, 314, 316, and/or 318) may be contained in one or more integrated processing cabinets (IPCs) 702.

In some embodiments, the user may be a pilot or crew member, who may be located onboard the aircraft 302 or at the offboard platform 312. For example, the user may interface with the system 300 via the at least one user interface 309 and/or 318. For example, the at least one user interface 309 may be implemented as any suitable user interface, such as a touchscreen (e.g., of the display unit computing device 304 and/or another display unit), a multipurpose control panel, a control panel integrated into a flight deck, a cursor control panel (CCP) (sometimes referred to as a display control panel (DCP)), an MKP, a keyboard, a mouse, a trackpad, at least one hardware button, a switch, an eye tracking system, and/or a voice recognition system. The user interface 309 may be configured to receive at least one user input and to output the at least one user input to a computing device (e.g., 304, 306, 308, 310, 314, and/or 316). For example, a pilot of the aircraft 302 may be able to interface with the user interface 309 to: select the user-selectable load button 106 to cause the system to load a NOTAM file into an ROAAS format. For example, such user inputs may be output to a computing device (e.g., 304, 306, 308, 310, 314, and/or 316).

Figure 4:
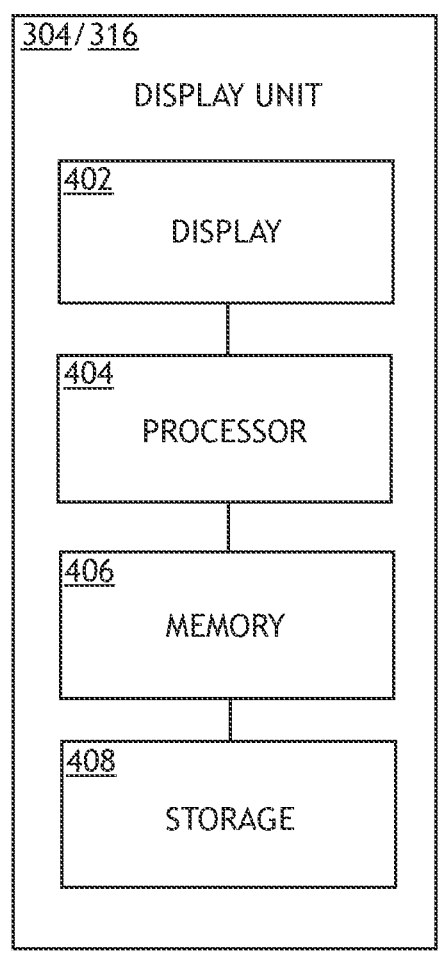
FIG. 4 is a view of an exemplary embodiment of a display unit computing device of FIG. 3 according to the inventive concepts disclosed herein.
Figure 5:
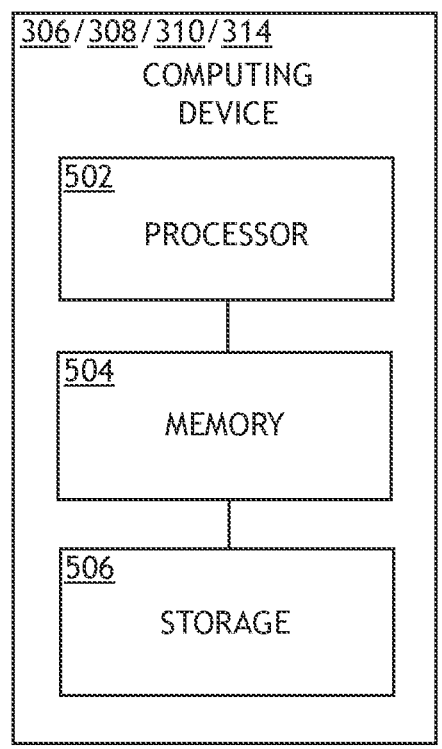
FIG. 5 is a view of an exemplary embodiment of a computing device of FIG. 3 according to the inventive concepts disclosed herein.
Figure 6:
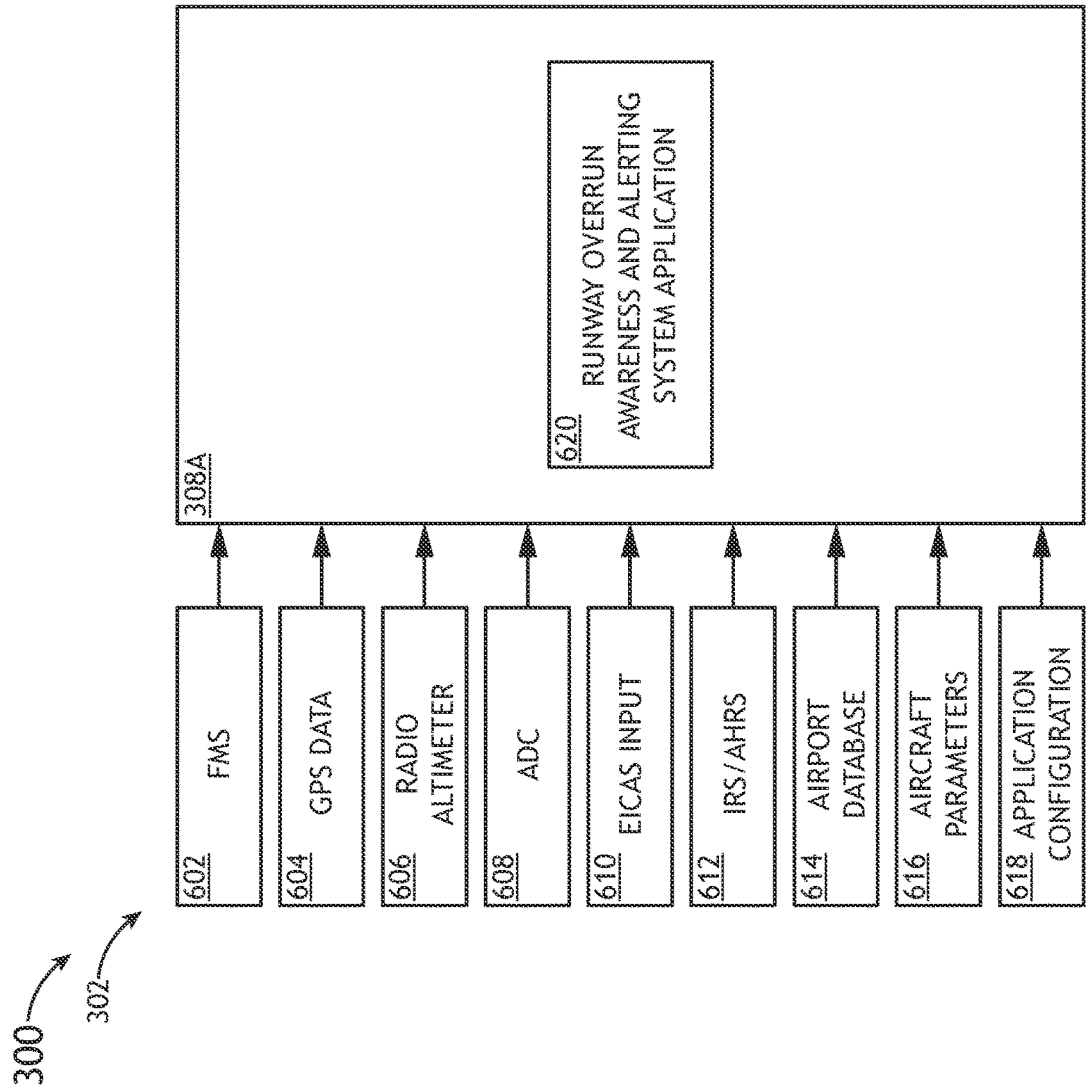
FIG. 6 is a view of a portion of an exemplary embodiment of the system of FIG. 3 according to the inventive concepts disclosed herein.
Figure 7:
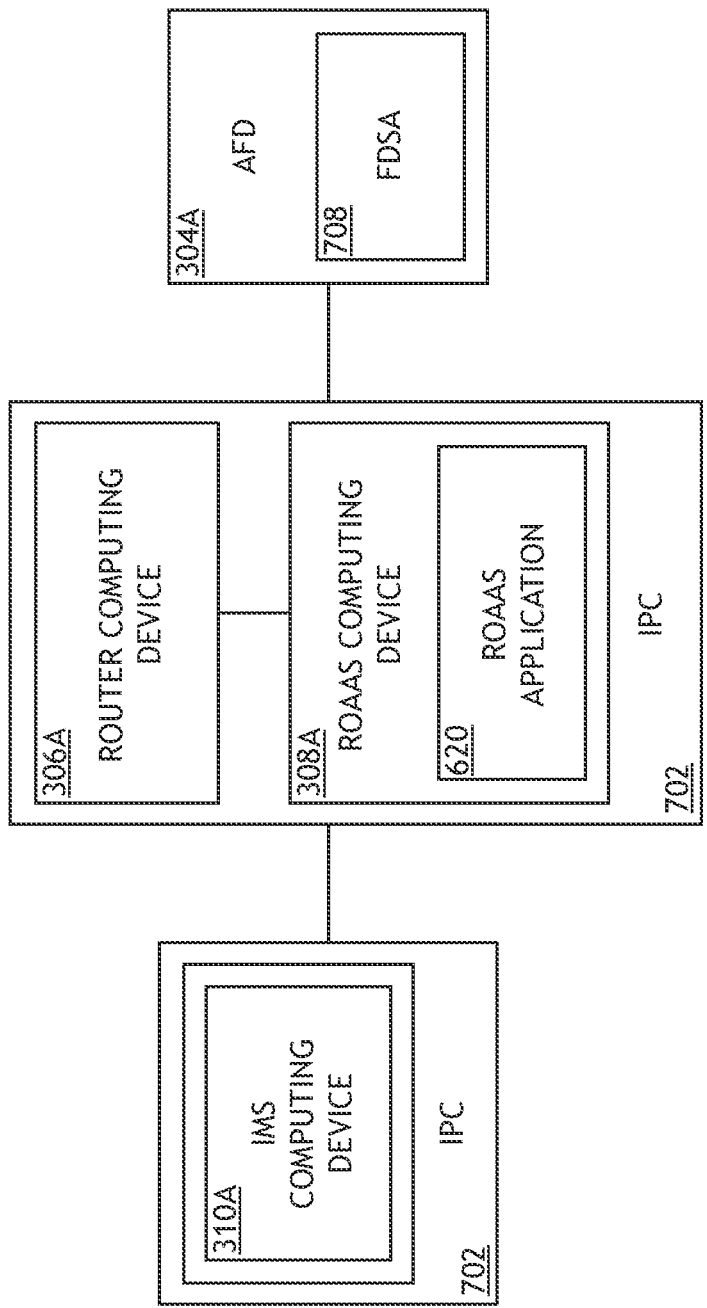
FIG. 7 is a view of a portion of an exemplary embodiment of the system of FIG. 3 according to the inventive concepts disclosed herein.

The display unit computing device 304 may be implemented as any suitable computing device, such as a primary flight display (PFD) computing device, a multi-function window (MFW) display computing device, and/or an adaptive flight display (AFD) 304A. As shown in FIG. 4, the display unit computing device 304 may include at least one display 402, at least one processor 404, at least one memory 406, and/or at least one storage 410, some or all of which may be communicatively coupled at any given time. For example, the at least one processor 404 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 404 may include a CPU and a GPU configured to perform (e.g., collectively perform) any of the operations disclosed throughout. The processor 404 may be configured to run various software applications (e.g., a flight display system application (FDSA 708A)) or computer code stored (e.g., maintained) in a non-transitory computer-readable medium (e.g., memory 406 and/or storage 410) and configured to execute various instructions or operations. The processor 404 may be configured to perform any or all of the operations disclosed throughout. For example, the at least one processor 404 may be configured to: obtain a Notice to Air Mission (NOTAM) associated with an approach procedure being performed by an aircraft toward a runway; extract information from the NOTAM, the information including information of at least one of a runway displaced threshold of the runway or a landing distance available on the runway; generate a NOTAM file including the information; update runway overrun awareness and alerting system (ROAAS) data including an existing runway displaced threshold value associated with the runway and an existing landing distance available value associated with the runway to be a current runway displaced threshold value 104 and a current landing distance available value 102 based on the information of the NOTAM file; generate a ROAAS image 100, wherein the ROAAS image 100 graphically and/or textually depicts a view indicative of the current runway displaced threshold value 104 and the current landing distance available value 102; and/or output the ROAAS image 100 to the display 402. The at least one display 402 may be configured to: display the ROAAS image 100 to a user.

The at least one computing device 306 may be implemented as any suitable computing device, such as a router computing device 306A (e.g., an avionics full-duplex switched ethernet (AFDX) computing device). The at least one computing device 306 may include any or all of the elements shown in FIG. 5. For example, the computing device 306 may include at least one processor 502, at least one memory 504, and/or at least one storage 506, some or all of which may be communicatively coupled at any given time. For example, the at least one processor 502 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 502 may include a CPU and a GPU configured to perform (e.g., collectively perform) any of the operations disclosed throughout. The processor 502 may be configured to run various software applications or computer code stored (e.g., maintained) in a non-transitory computer-readable medium (e.g., memory 504 and/or storage 506) and configured to execute various instructions or operations. The processor 502 of the computing device 306 may be configured to perform any or all of the operations disclosed throughout. In some embodiments, the at least one processor 502 may be configured to route data (e.g., graphical data, NOTAM file(s), NOTAM data, and/or ROAAS data) to and/or from other computing devices (e.g., e.g., 304, 308, 310, 314, and/or 316) of the system 300. For example, the at least one processor 502 may be configured to: obtain a Notice to Air Mission (NOTAM) associated with an approach procedure being performed by an aircraft toward a runway; extract information from the NOTAM, the information including information of at least one of a runway displaced threshold of the runway or a landing distance available on the runway; generate a NOTAM file including the information; update runway overrun awareness and alerting system (ROAAS) data including an existing runway displaced threshold value associated with the runway and an existing landing distance available value associated with the runway to be a current runway displaced threshold value 104 and a current landing distance available value 102 based on the information of the NOTAM file; generate a ROAAS image 100, wherein the ROAAS image 100 graphically and/or textually depicts a view indicative of the current runway displaced threshold value 104 and the current landing distance available value 102; and/or output the ROAAS image 100 to the display 402.

The at least one computing device 308 may be implemented as any suitable computing device, such as a ROAAS computing device 308A. The at least one computing device 308 may include any or all of the elements shown in FIG. 5. For example, the computing device 308 may include at least one processor 502, at least one memory 504, and/or at least one storage 506, some or all of which may be communicatively coupled at any given time. For example, the at least one processor 502 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 502 may include a CPU and a GPU configured to perform (e.g., collectively perform) any of the operations disclosed throughout. The processor 502 may be configured to run various software applications (e.g., a ROAAS application 620) or computer code stored (e.g., maintained) in a non-transitory computer-readable medium (e.g., memory 504 and/or storage 506) and configured to execute various instructions or operations. The at least one processor 502 of the computing device 308 may be configured to perform any or all of the operations disclosed throughout. For example, the at least one processor 502 may be configured to: obtain a Notice to Air Mission (NOTAM) associated with an approach procedure being performed by an aircraft toward a runway; extract information from the NOTAM, the information including information of at least one of a runway displaced threshold of the runway or a landing distance available on the runway; generate a NOTAM file including the information; update runway overrun awareness and alerting system (ROAAS) data including an existing runway displaced threshold value associated with the runway and an existing landing distance available value associated with the runway to be a current runway displaced threshold value 104 and a current landing distance available value 102 based on the information of the NOTAM file; generate a ROAAS image 100, wherein the ROAAS image 100 graphically and/or textually depicts a view indicative of the current runway displaced threshold value 104 and the current landing distance available value 102; and/or output the ROAAS image 100 to the display 402.

The at least one computing device 310 may be implemented as any suitable computing device, such as IMS computing device 310A. The at least one computing device 310 may include any or all of the elements shown in FIG. 5. For example, the computing device 310 may include at least one processor 502, at least one memory 504, at least one port (e.g., a USB port) (not shown), and/or at least one storage 506, some or all of which may be communicatively coupled at any given time. For example, the at least one processor 502 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 502 may include a CPU and a GPU configured to perform (e.g., collectively perform) any of the operations disclosed throughout. The processor 502 may be configured to run various software applications (e.g., a IMS application) or computer code stored (e.g., maintained) in a non-transitory computer-readable medium (e.g., memory 504 and/or storage 506) and configured to execute various instructions or operations. The at least one processor 502 of the computing device 310 may be configured to perform any or all of the operations disclosed throughout. For example, the at least one processor 502 may be configured to: obtain a Notice to Air Mission (NOTAM) associated with an approach procedure being performed by an aircraft toward a runway; extract information from the NOTAM, the information including information of at least one of a runway displaced threshold of the runway or a landing distance available on the runway; generate a NOTAM file including the information; update runway overrun awareness and alerting system (ROAAS) data including an existing runway displaced threshold value associated with the runway and an existing landing distance available value associated with the runway to be a current runway displaced threshold value 104 and a current landing distance available value 102 based on the information of the NOTAM file; generate a ROAAS image 100, wherein the ROAAS image 100 graphically and/or textually depicts a view indicative of the current runway displaced threshold value 104 and the current landing distance available value 102; and/or output the ROAAS image 100 to the display 402.

In some embodiments, the at least one offboard platform 312 may be any suitable offboard site (e.g., a ground site, such as an air traffic control tower) and/or offboard mobile platform (e.g., another vehicle). In some embodiments, the offboard platform 312 may include at least one user (e.g., flight crew and/or pilot(s)), at least one computing device 314, at least one display unit computing device 316, and/or at least one user interface 318, some or all of which may be communicatively coupled at any given time. In some embodiments, the at least one computing device 314 may be configured similarly and function similarly to some combination of the computing devices (e.g., 304, 306, 308, and/or 310) of the aircraft 302, except that the at least one computing device 314 is located offboard of the aircraft 302. In some embodiments, the at least one display unit computing device 316 may be configured similarly and function similarly to the at least one display unit computing device 304 of the aircraft 302, except that the at least one display unit computing device 316 is located offboard of the aircraft 302. In some embodiments, the at least one user interface 318 may be configured similarly and function similarly to the at least one user interface 309 of the aircraft 302, except that the at least one user interface 318 is located offboard of the aircraft 302.

For example, at least one processor (e.g., the at least one processor 404 (e.g., of the at least one display unit computing device 304 and/or 316) and/or the at least one processor 502 (e.g., of the at least one computing device 306, 308, 310, and/or 314)) may be configured to (e.g., collectively configured to, if more than one processor): obtain a Notice to Air Mission (NOTAM) associated with an approach procedure being performed by an aircraft toward a runway; extract information from the NOTAM, the information including information of at least one of a runway displaced threshold of the runway or a landing distance available on the runway; generate a NOTAM file including the information; update runway overrun awareness and alerting system (ROAAS) data including an existing runway displaced threshold value associated with the runway and an existing landing distance available value associated with the runway to be a current runway displaced threshold value 104 and a current landing distance available value 102 based on the information of the NOTAM file; generate a ROAAS image 100, wherein the ROAAS image 100 graphically and/or textually depicts a view indicative of the current runway displaced threshold value 104 and the current landing distance available value 102; and/or output the ROAAS image 100 to the display 402.

In some embodiments, at least one processor (e.g., the at least one processor 404 (e.g., of the at least one display unit computing device 304 and/or 316) and/or the at least one processor 502 (e.g., of the at least one computing device 306, 308, 310, and/or 314)) may be further configured to (e.g., collectively configured to, if more than one processor): operate the aircraft to one of complete the approach procedure or perform a go-around procedure based at least on the current runway displaced threshold value and the current landing distance available value.

In some embodiments, at least one processor (e.g., the at least one processor 404 (e.g., of the at least one display unit computing device 304 and/or 316) and/or the at least one processor 502 (e.g., of the at least one computing device 306, 308, 310, and/or 314)) may be further configured to (e.g., collectively configured to, if more than one processor): receive a user selection to update the ROAAS data based at least on the obtained NOTAM.

In some embodiments, at least one processor (e.g., the at least one processor 404 (e.g., of the at least one display unit computing device 304 and/or 316) and/or the at least one processor 502 (e.g., of the at least one computing device 306, 308, 310, and/or 314)) may be further configured to (e.g., collectively configured to, if more than one processor): extract the information from the NOTAM by parsing text of the NOTAM, wherein the NOTAM file includes the information as metadata.

In some embodiments, the ROAAS image 100 further graphically and/or textually indicates that a change has occurred to at least one of the current runway displaced threshold value 104 or the current landing distance available value 102. In some embodiments, the indication that the change has occurred is presented at least as a textual indication that at least one of the current runway displaced threshold value 104 or the current landing distance available value 102 has been updated. In some embodiments, the indication that the change has occurred is presented at least by a color (e.g., a change to a magenta color) of at least one of the current runway displaced threshold value 104 or the current landing distance available value 102.

The at least one processor (e.g., the at least one processor 404 (e.g., of the at least one display unit computing device 304 and/or 316) and/or the at least one processor 502 (e.g., of the at least one computing device 306, 308, 310, and/or 314)) may be configured to (e.g., collectively configured to, if more than one processor) perform any or all of the operations disclosed throughout.

Figure 8:
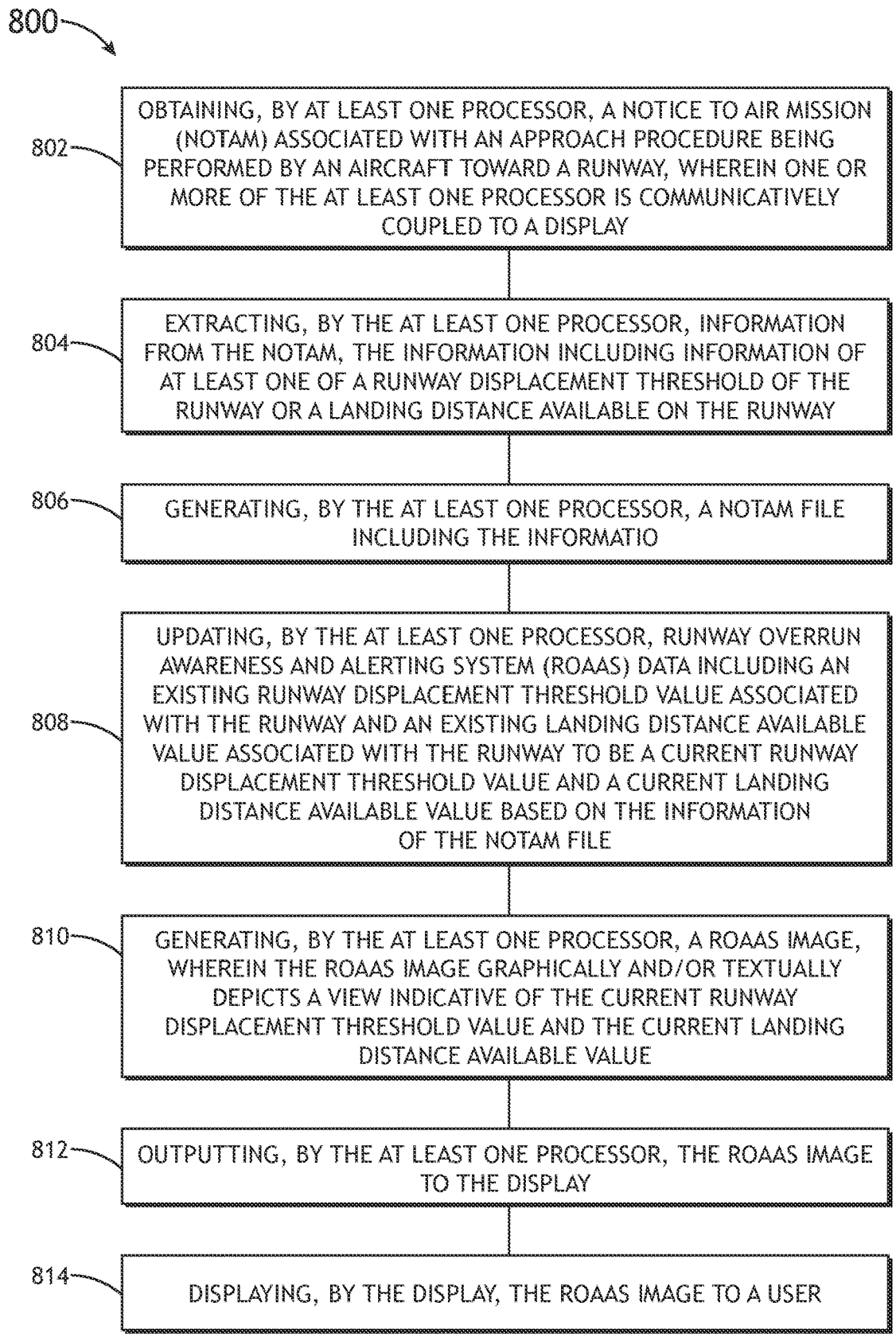
FIG. 8 is a diagram of an exemplary embodiment of a method according to the inventive concepts disclosed herein.

Referring now to FIG. 8, an exemplary embodiment of a method 800 according to the inventive concepts disclosed herein may include one or more of the following steps. Additionally, for example, some embodiments may include performing one or more instances of the method 800 iteratively, concurrently, and/or sequentially. Additionally, for example, at least some of the steps of the method 800 may be performed in parallel and/or concurrently. Additionally, in some embodiments, at least some of the steps of the method 800 may be performed non-sequentially.

A step 802 may include obtaining, by at least one processor, a Notice to Air Mission (NOTAM) associated with an approach procedure being performed by an aircraft toward a runway, wherein one or more of the at least one processor is communicatively coupled to a display.

A step 804 may include extracting, by the at least one processor, information from the NOTAM, the information including information of at least one of a runway displaced threshold of the runway or a landing distance available on the runway.

A step 806 may include generating, by the at least one processor, a NOTAM file including the information.

A step 808 may include updating, by the at least one processor, runway overrun awareness and alerting system (ROAAS) data including an existing runway displaced threshold value associated with the runway and an existing landing distance available value associated with the runway to be a current runway displaced threshold value and a current landing distance available value based on the information of the NOTAM file.

A step 810 may include generating, by the at least one processor, a ROAAS image, wherein the ROAAS image graphically and/or textually depicts a view indicative of the current runway displaced threshold value and the current landing distance available value.

A step 812 may include outputting, by the at least one processor, the ROAAS image to the display.

A step 814 may include displaying, by the display, the ROAAS image to a user.

Further, the method 800 may include any of the operations disclosed throughout.

As will be appreciated from the above, embodiments of the inventive concepts disclosed herein may be directed to a method and a system including at least one processor configured to extract information of a runway displaced threshold of a runway and/or a landing distance available on the runway from a Notice to Air Mission (NOTAM), to update runway overrun awareness and alerting system (ROAAS) data to be a current runway displaced threshold value and a current landing distance available value, and/or to generate a ROAAS image.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
 a display; and
 at least one processor, one or more of the at least one processor communicatively coupled to the display, the at least one processor configured to:
  obtain a Notice to Air Mission (NOTAM) associated with an approach procedure being performed by an aircraft toward a runway;
  extract information from the NOTAM, the information including information of at least one of a runway displaced threshold of the runway or a landing distance available on the runway;
  generate a NOTAM file including the information;
  update runway overrun awareness and alerting system (ROAAS) data including an existing runway displaced threshold value associated with the runway and an existing landing distance available value associated with the runway to be a current runway displaced threshold value and a current landing distance available value based on the information of the NOTAM file;
  generate a ROAAS image, wherein the ROAAS image graphically and/or textually depicts a view indicative of the current runway displaced threshold value and the current landing distance available value; and
  output the ROAAS image to the display;
 wherein the display is configured to display the ROAAS image to a user.

2. The system of claim 1, wherein the at least one processor is further configured to operate the aircraft to one of complete the approach procedure or perform a go-around procedure based at least on the current runway displaced threshold value and the current landing distance available value.

3. The system of claim 2, wherein the at least one processor is further configured to operate the aircraft to complete the approach procedure based at least on the current runway displaced threshold value and the current landing distance available value.

4. The system of claim 2, wherein the at least one processor is further configured to operate the aircraft to perform the go-around procedure based at least on the current runway displaced threshold value and the current landing distance available value.

5. The system of claim 1, wherein the ROAAS image graphically and textually depicts the view indicative of the current runway displaced threshold value and the current landing distance available value.

6. The system of claim 1, wherein the ROAAS image further graphically and/or textually indicates that a change has occurred to at least one of the current runway displaced threshold value or the current landing distance available value.

7. The system of claim 6, wherein the indication that the change has occurred is presented at least as a textual indication that at least one of the current runway displaced threshold value or the current landing distance available value has been updated.

8. The system of claim 6, wherein the indication that the change has occurred is presented at least by a color of at least one of the current runway displaced threshold value or the current landing distance available value.

9. The system of claim 1, wherein the user is located offboard of the aircraft.

10. The system of claim 1, wherein the user is located onboard the aircraft.

11. The system of claim 1, further comprising: a display unit computing device comprising the display and at least one first processor of the at least one processor; and a ROAAS computing device comprising at least one second processor of the at least one processor, wherein the at least one second processor is configured to execute a ROAAS application.

12. The system of claim 11, further comprising a router computing device and an information management system (IMS) computing device, the IMS computing device comprising at least one third processor of the at least one processor, wherein the display unit computing device, the IMS computing device, and the ROAAS computing device are communicatively coupled via the router computing device, wherein the display unit computing device, the IMS computing device, the ROAAS computing device, and the router computing device are onboard the aircraft.

13. The system of claim 12, wherein the display unit computing device is an adaptive flight display (AFD) onboard the aircraft, wherein the at least one first processor of the AFD is configured to execute a flight display system application (FDSA).

14. The system of claim 12, wherein the display unit computing device is offboard of the aircraft.

15. The system of claim 1, wherein the at least one processor is further configured to receive a user selection to update the ROAAS data based at least on the obtained NOTAM.

16. The system of claim 1, wherein the at least one processor is further configured to extract the information from the NOTAM by parsing text of the NOTAM, wherein the NOTAM file includes the information as metadata.

17. A method, comprising:
obtaining, by at least one processor, a Notice to Air Mission (NOTAM) associated with an approach procedure being performed by an aircraft toward a runway, wherein one or more of the at least one processor is communicatively coupled to a display;
extracting, by the at least one processor, information from the NOTAM, the information including information of at least one of a runway displaced threshold of the runway or a landing distance available on the runway;
generating, by the at least one processor, a NOTAM file including the information;
updating, by the at least one processor, runway overrun awareness and alerting system (ROAAS) data including an existing runway displaced threshold value associated with the runway and an existing landing distance available value associated with the runway to be a current runway displaced threshold value and a current landing distance available value based on the information of the NOTAM file;
generating, by the at least one processor, a ROAAS image, wherein the ROAAS image graphically and/or textually depicts a view indicative of the current runway displaced threshold value and the current landing distance available value;
outputting, by the at least one processor, the ROAAS image to the display; and
displaying, by the display, the ROAAS image to a user.

18. The method of claim 17, further comprising: operating, by the at least one processor, the aircraft to one of complete the approach procedure or perform a go-around procedure based at least on the current runway displaced threshold value and the current landing distance available value.

* * * * *